UNITED STATES PATENT OFFICE.

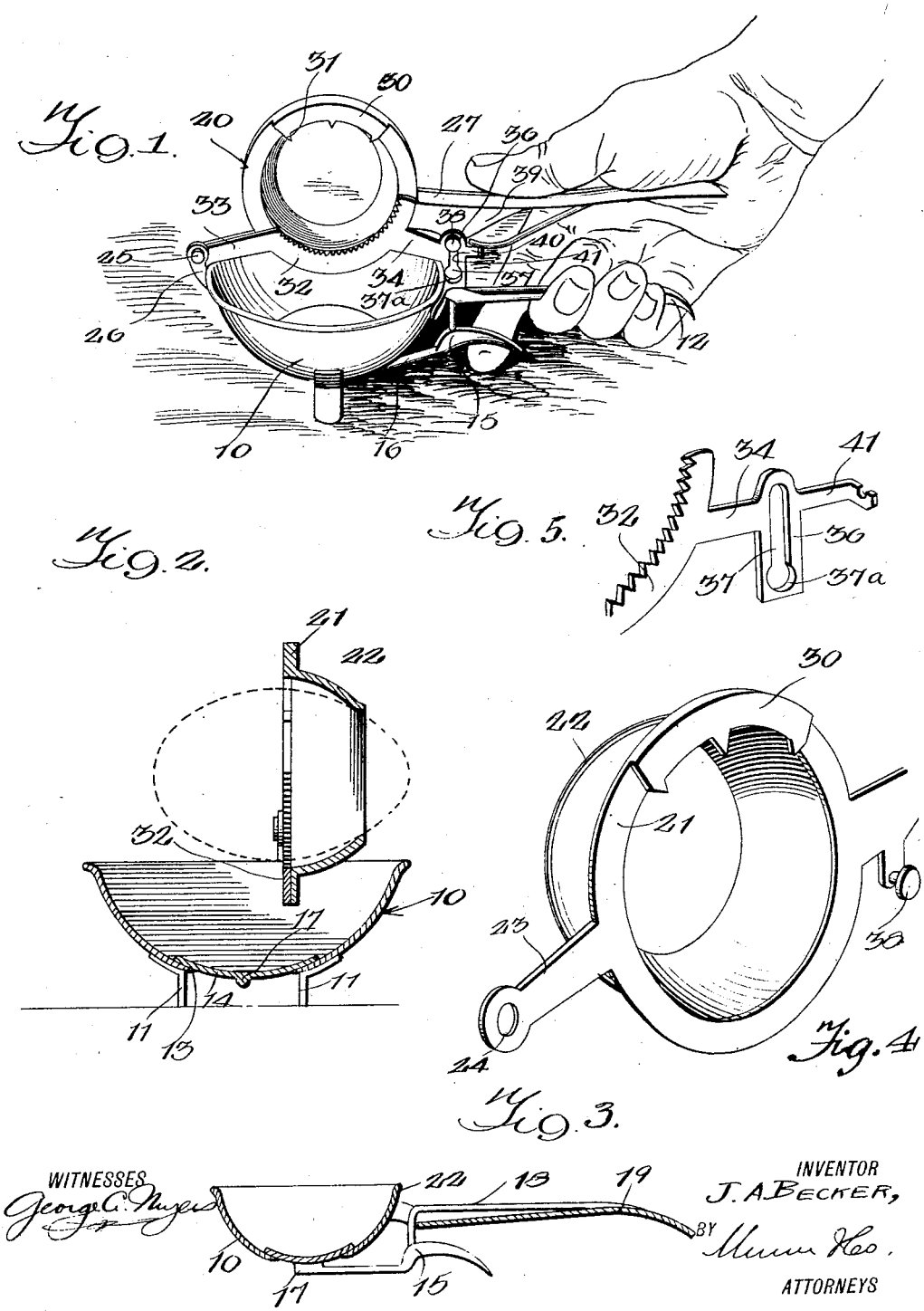

JOHN A. BECKER, OF NAMPA, IDAHO.

EGG BREAKER AND SEPARATOR.

1,409,649.  Specification of Letters Patent.  Patented Mar. 14, 1922.

Application filed August 1, 1921. Serial No. 488,954.

*To all whom it may concern:*

Be it known that I, JOHN A. BECKER, a citizen of the United States, and a resident of Nampa, in the county of Canyon and State of Idaho, have invented certain new and useful Improvements in Egg Breakers and Separators, of which the following is a specification.

The present invention relates to an improvement in egg breakers and separators, and has for its object to provide a device of this character which is adapted to cleanly and sharply break the shell of the egg without breaking off fragments of the shell, which provides a receiver for the yolk and white of the egg and means for separating the yolk from the white when desired and which is in general of simple and durable construction, reliable in operation, and easy and inexpensive to manufacture.

Another object of the invention is to provide a device of this character in which the receiver and the egg breaker may be so disposed with respect to each other during the breaking operation that the white and yolk of the egg drop into the receiver as an incident to the breaking operation, the breaker being capable of being moved away from the receiver after the breaking operation so that free and unobstructed access may be had to the interior of the receiver.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a perspective view of the preferred embodiment of the invention;

Figure 2 is a view in transverse vertical section through the receiver, egg carrier and the breaking mechanism;

Figure 3 is a view in longitudinal section, illustrating the egg receiving cup, the egg separating means and associated structure.

Figure 4 is a detail perspective view of the egg carrier and associated structure; and Figure 5 is a fragmentary perspective view, illustrating the guiding mechanism and spring seat of the breaker blade.

Referring to the drawings wherein for the sake of illustration is shown the preferred embodiment of the invention, the numeral 10 designates an egg receiver which preferably takes the form of a cup. The egg receiver is mounted on feet 11 and is provided with a handle 12 which is fixed to the side wall thereof and extends laterally therefrom. As shown in the drawings the handle is preferably channel-shaped. A central opening 13 is provided in the bottom of the egg receiver 10 and is normally closed by a dished plate valve 14. When the dished plate valve 14 is opened, it defines with the cup a discharge outlet for the white of the egg, the yolk being trapped in the dished plate valve. If it is desired, the yolk and the white may be discharged from the cup without being separated by being poured out over the side of the cup. The dished plate valve 14 is controlled by a finger piece 15 which underlies the handle 12 and which has an arm 16 connected with the underside of the valve 14, as at 17. A spring 18 operates in the channel shaped handle 12 and has one end 19 secured to the handle, the other end being offset and secured to the finger piece. The spring 18 is tensioned so as to close the valve 14.

An egg carrier, designated generally at 20 is associated with the egg receiving cup and includes a ring 21 and a bowl 22 preferably integral with the ring. A pivot arm 23 is integrally formed or otherwise connected with the ring 21 and at its free end is provided with a pivot opening 24 whereby the egg carrier is pivotally mounted on the egg receiving cup by means of a pivot bolt 25 carried by the pivot lug 26 and operating in the pivot opening 24 of the pivot arm 23. At the opposite side from the pivot arm a handle 27 is secured to the egg carrier and extends laterally therefrom. The handle 27 overlies the handle 12 and coacts therewith in the operation of the device as will hereinafter more fully appear.

An egg gripping jaw 30 is fixed to the upper portion of the egg ring and includes teeth or prongs 31 which engage the egg shell. Opposed to the jaw 30 and coacting therewith in the egg breaking operation is a curved and toothed breaker blade 32. A pivot arm 33 extends from one end of the breaker blade and is pivotally mounted upon the pivot bolt 25 so that the egg carrier and the breaker blade may be swung as a unit from the operative position shown in Figure 1 into inoperative position away from the egg receiving cup whereby free access may be had thereto. An abutment arm 34 extends from the breaker blade adjacent the free end thereof and engages the egg receiving cup in the operative position of the device as shown in Figure 1, to limit the movement of the breaker blade and hold it fixed relative to the egg carrier.

The jaw and the breaker blade constitute the egg breaking mechanism and coact to cleanly and sharply break the shell of the egg without breaking off fragments of the shell to mingle with the yolk and white of the egg.

A guide plate 36 is rigidly secured to, preferably formed integral with, the abutment arm 34 and is provided with a guide slot 37 in which a headed guide stud 38 carried by a depending portion 39 of the handle 27 operates to constrain the breaker blade and the egg carrier and the jaw 30 to proper motion, the slot 37 being enlarged adjacent its lower end, as at 37ᵃ to facilitate assembly.

A spring 40 has one end fixed to the handle 27 and has its free end operating on a spring seat 41 carried by the guide plate. The spring 40 is tensioned to maintain the breaker blade and the egg carrier and its jaw 30 in inoperative and non-egg breaking position, with the toothed breaker blade spaced the maximum distance from the jaw 30.

In operation the egg is placed in the egg carrier as indicated in dotted lines in Figure 2. The handles 12 and 27 are then grasped, as shown in Figure 1. As these handles are controlled by one hand the operator has the other hand free to maintain the egg in position if this is found necessary. When the operator exerts pressure upon the handles 12 and 27 the jaw 30 approaches the breaker blade 32 and they both coact to sever the shell of the egg. The white and yolk of the egg drop into the egg receiving cup 10. Without removing the hand from the handles 12 and 27 the operator may effect a separation of the white from the yolk by manipulating the finger piece 15 with the index finger, as shown in Figure 1. If a separation of the yolk and the white is not desired, the egg carrier and the breaker blade may be swung as a unit away from the top of the egg receiving cup by simply grasping the handle 27 and rotating these parts about their pivot bolt 25. When this is done free access may be had to the egg receiving cup and the eggs may be beat or otherwise operated upon while in the cup.

I claim:

1. In a device of the character described, an egg receiving cup having feet, a handle fixed to said cup and extending laterally therefrom, an egg-carrier including a ring having a pivot arm, a pivot lug on said receiver, a pivot bolt connecting said arm and said lug, a handle fixed to said ring and overlying the first-mentioned handle, a jaw fixed to said ring, a breaker blade coacting with said jaw and movable across the face of the ring and having a pivot arm connected with said pivot bolt and an abutment arm engageable with the cup to maintain the breaker blade fixed relative to the egg cup, a slotted guide plate carried by the abutment arm, a headed guide stud operating in the slot of the guide plate and carried by the handle of the egg carrier, a spring having one end secured to the handle of the egg carrier, and a spring seat carried by the guide plate and upon which the free end of said spring is operatively mounted.

2. In a device of the character described, an egg receiver, an egg carrier having an arm pivotally connected to the receiver to movably support the egg carrier with respect thereto, an egg gripping jaw arranged on the egg carrier, a breaker blade coacting with the jaw and having an arm pivotally connected to the receiver and an arm abutting the receiver whereby the breaker blade is fixed relative to the egg carrier and operating mechanism for moving the egg carrier relative to the breaker blade.

3. In a device of the character described, an egg receiving cup having egg separating means, an egg carrier pivotally mounted on said cup and overlying the same in operative position, a breaker blade pivotally mounted on said cup and engageable therewith to be fixed relative to the egg carrier in operative position, handles cooperable with the egg carrier and the breaker blade, and a finger piece underlying the handles for operating the egg separating mechanism.

4. In a device of the character described, an egg receiving cup having egg separating means, an egg carrier pivotally mounted on said cup and overlying the same in operative position, and a breaker blade pivotally mounted on said cup and engageable therewith to be fixed relative to the egg carrier in operative position.

5. In a device of the character described, an egg receiving cup, an egg carrier having an arm, egg breaking mechanism having an arm, common means for pivotally connecting said arms to the egg receiving cup and to each other and operating mechanism for the egg breaking mechanism including a handle.

6. In a device of the character described, an egg receiving cup, an egg carrier, egg breaking mechanism, and means for pivotally connecting the egg carrier and the egg breaking mechanism to the cup whereby they may be disposed in operative position over the cup or swung over to the side of the cup.

7. In a device of the character described, an egg receiving cup, an egg carrier pivotally mounted on said cup and overlying the same in operative position, a breaker blade pivotally mounted on the cup and cooperable with the egg carrier, said breaker blade being engageable with the cup to be fixed relative to the egg carrier in operative position and a handle for imparting relative movement to the egg carrier and breaker blade.

JOHN A. BECKER.